United States Patent Office 3,385,892
Patented May 28, 1968

3,385,892
BORIC ACID-NITROGEN COMPOUNDS
Ludwig Konrad Huber, Philadelphia, Pa., assignor to Pennsalt Chemicals Corporation, Philadelphia, Pa., a corporation of Pennsylvania
No Drawing. Filed Jan. 6, 1965, Ser. No. 423,816
5 Claims. (Cl. 260—583)

ABSTRACT OF THE DISCLOSURE

A compound of the formula $(CH_3)_nNH_{(3-n)}mHBO_2$ wherein $n$ is a digit from 2 to 3 and $m$ is 3 where $n$ is 2 and further $m$ is 4 when $n$ is 3, which is produced by reacting the corresponding amine with boric acid in a non-aqueous system, useful as corrosion inhibitors.

This invention relates to new nitrogen compounds which are formed from boric acid and methylamines.

It is known in the art that boric acid reacts with alkylamines (Ferrari et al., C.A. 36, p. 1864, 1942). In this prior art disclosure, an aqueous solution of the alkylamines is reacted with boric acid, and the insoluble products which form are found to be decaborates. For example, methyl amine and boric acid yielded methyl ammonium decaborate having the formula $(CH_3NH_3)_2B_{10}O_{16} \cdot 8H_2O$.

We have now found, however, that if a methylamine selected from the class of dimethylamine and trimethylamine is reacted with boric acid in a non-aqueous system, a product is formed which is not a decaborate, but which contains three or four atoms of boron per nitrogen of the amine.

The products of the invention have the empirical formula $$[(CH_3)_nNH_{(3-n)}] \cdot mHBO_2$$

where $n$ is a digit from two to three, and $m$ is 3 where $n$ is 2 and is 4 when $n$ is 3. These compounds are solids which show decomposition at unexpectedly high temperatures, being of the order of 225° C. or higher.

In preparing the compounds of this invention, boric acid is first dissolved in dimethylformamide, dimethylacetamide or other organic solvent which is a mutual solvent for both boric acid and the amine to be used. Then, either gaseous amine or a solution of the amine in the solvent is added to the boric acid solution, generally at room temperature. The reaction proceeds rapidly and the colorless product precipitates. The product is filtered off, washed with the solvent used and generally with another organic solvent such as benzene and then dried under vacuum. The invention is further illustrated by the preparative examples which follow:

Example I.—Reaction of boric acid with dimethylamine

Dimethylamine gas is passed into a clear, room-temperature solution of 30.9 g. (0.5 M) of boric acid in 180 ml. of dimethylformamide. Reaction occurs rapidly and a colorless precipitate forms immediately. The precipitate is filtered off, washed with dimethylformamide and benzene and then dried under vacuum (0.1 mm. mercury) to obtain the product in 91% yield based on boric acid used. The product decomposes at 230° C. The following analysis confirms that the product has the structure.

$$(CH_3)_2NH \cdot 3HBO_2$$

Calc. for $(CH_3)_2NH \cdot 3HBO_2$: 13.60% C, 5.71% H, 7.92% N, 18.38% B. Found: 13.98% C, 5.36% H, 7.00% N, 18.18% B. An infra-red spectrum indicates a boroxole type absorption at about 698 cm.$^{-1}$ and 718 cm.$^{-1}$.

Example II.—Reaction of boric acid with trimethylamine

Into a solution of 6.2 g. boric acid (0.1 mole) in 30 ml. dimethylformamide, gaseous trimethylamine is introduced at room temperature. The colorless precipitate which forms is filtered, washed with benzene and dried under high vacuum (0.1 mm. Hg) to yield 5.3 g. product (88% of theory). The product softens and foams at about 245° C. and then resolidifies. Calculated for $(CH_3)_3N \cdot 4HBO_2$: 15.37% C, 5.59% H, 5.98% N, 18.46% B. Found: 15.35% C, 5.58% H, 5.22% N, 18.32% B. The compound shows IR-absorption at 700 cm.$^{-1}$ and 720 cm.$^{-1}$.

The compounds of the invention are useful as corrosion inhibitors for metals and, when applied to the surface of ferrous metals, will inhibit rusting of the metal when it is exposed to normal atmospheric conditions. Tests of the products illustrate their corrosion inhibition properties and such tests indicate that these materials show greater corrosive inhibition action than borax alone which is a known inhibitor.

It will be understood that numerous changes and variations may be made from the above description and examples without departing from the spirit and scope of the invention.

I claim:
1. A compound having the formula

$$[(CH_3)_nNH_{(3-n)}] \cdot mHBO_2$$

where $n$ is a digit from 2 to 3 and $m$ is a digit from 3 to 4, $m$ being 3 when $n$ is 2 and $m$ being 4 when $n$ is 3.

2. An adduct of boric acid and dimethylamine having the formula $(CH_3)_2NH \cdot 3HBO_2$.

3. An adduct of boric acid and trimethylamine having the formula $(CH_3)_3N \cdot 4HBO_2$.

4. The process of making an adduct of boric acid and an amine selected from the group consisting of dimethylamine and trimethylamine which comprises reacting at about room temperature boric acid and the amine in a non-aqueous system which is a mutual solvent for both boric acid and the amine and thereafter separating the precipitate which forms.

5. The process of claim 4 wherein the non-aqueous system is dimethylformamide.

References Cited

Ferrari et al., "Chem. Abstracts," vol. 36, p. 1864 (1942).

CHARLES B. PARKER, Primary Examiner.

D. R. PHILLIPS, Assistant Examiner.